(12) United States Patent
Tully, Jr.

(10) Patent No.: US 8,303,208 B2
(45) Date of Patent: Nov. 6, 2012

(54) LOCKNUT ASSEMBLY FOR A COAXIAL SHAFT

(75) Inventor: Thomas L. Tully, Jr., Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 172 days.

(21) Appl. No.: 12/809,633

(22) PCT Filed: Dec. 21, 2007

(86) PCT No.: PCT/US2007/088505
§ 371 (c)(1),
(2), (4) Date: Jun. 21, 2010

(87) PCT Pub. No.: WO2009/082396
PCT Pub. Date: Jul. 2, 2009

(65) Prior Publication Data
US 2010/0270421 A1 Oct. 28, 2010

(51) Int. Cl.
*B64D 35/00* (2006.01)
(52) U.S. Cl. .................. 403/359.5; 403/320; 403/374.3; 244/60
(58) Field of Classification Search .......... 403/299, 403/320, 335, 337, 359.5, 374.3; 411/140; 244/60, 17.11, 17.23
See application file for complete search history.

(56) References Cited

U.S. PATENT DOCUMENTS

| | | | | |
|---|---|---|---|---|
| 1,420,737 A | * | 6/1922 | Palmgren | 411/204 |
| 2,899,222 A | * | 8/1959 | Ross | 403/16 |
| 4,175,913 A | * | 11/1979 | Rybicki | 416/244 R |
| 4,281,967 A | | 8/1981 | Mouille et al. | |
| 4,505,628 A | | 3/1985 | Meibuhr | |
| 4,575,102 A | | 3/1986 | Raj et al. | |
| 4,583,704 A | * | 4/1986 | Krauss et al. | 244/17.11 |
| 4,622,730 A | * | 11/1986 | Steinbock | 492/1 |
| RE33,490 E | * | 12/1990 | Steinbock | 492/2 |
| 5,069,587 A | * | 12/1991 | Levenstein | 411/432 |
| 5,116,178 A | * | 5/1992 | Lerman et al. | 411/87 |
| 5,197,345 A | * | 3/1993 | Rose | 74/421 R |
| 5,199,849 A | | 4/1993 | Leman | |
| 5,203,441 A | * | 4/1993 | Monette | 192/112 |
| 5,224,360 A | | 7/1993 | Kawase et al. | |
| 5,266,008 A | * | 11/1993 | Ehrbar | 416/204 R |
| 5,273,497 A | | 12/1993 | Wallace | |
| 5,354,245 A | | 10/1994 | Wallace | |
| 5,609,456 A | * | 3/1997 | Joki | 411/433 |
| 5,662,445 A | * | 9/1997 | Harbottle et al. | 411/433 |
| 5,791,592 A | | 8/1998 | Nolan et al. | |
| 5,941,335 A | * | 8/1999 | Krisher | 180/255 |
| 6,019,578 A | | 2/2000 | Hager et al. | |
| 6,030,177 A | | 2/2000 | Hager | |

(Continued)

OTHER PUBLICATIONS

International search report and written opinion, dated May 22, 2008, PCT/US2007/088505.

*Primary Examiner* — Joshua Kennedy
(74) *Attorney, Agent, or Firm* — Carlson, Gaskey & Olds PC (57) ABSTRACT

An exemplary lock out assembly includes a lock nut defined about an axis. The lock nut defines inner apertures along an inner diameter and outer apertures along an outer diameter. The inner apertures are at least partially threaded. The outer apertures are at least partially threaded. The inner apertures are radially spaced from the outer apertures.

19 Claims, 6 Drawing Sheets

U.S. PATENT DOCUMENTS

| | | |
|---|---|---|
| 6,196,759 B1 * | 3/2001 | Casarotto .................... 403/373 |
| 6,293,492 B1 | 9/2001 | Yanagisawa |
| 6,544,157 B1 | 4/2003 | Spatafora |
| 6,712,313 B2 * | 3/2004 | Zoppitelli et al. ......... 244/17.11 |
| 6,893,160 B2 | 5/2005 | Casey |
| 2004/0037638 A1 * | 2/2004 | Zimmerman et al. ..... 403/374.3 |
| 2004/0155554 A1 | 8/2004 | Morgante |
| 2005/0029476 A1 | 2/2005 | Biester |
| 2010/0206162 A1 * | 8/2010 | Blue .......................... 92/165 R |

* cited by examiner

LOCKNUT ASSEMBLY FOR A COAXIAL SHAFT

BACKGROUND OF THE INVENTION

The present invention is directed to a locknut assembly.

Various coaxial shaft arrangements utilize a locknut assembly to position and retain a component on the shaft structure. One such coaxial shaft arrangement is that of a rotary-wing aircraft counter-rotating, coaxial rotor system. The rotor system mounts a final gear reduction stage output gear to an outer rotor shaft via a spline and locknut. The coaxial rotor system also mounts an outer bearing on the outer diameter of the outer coaxial rotor shaft and an inner bearing between the outer coaxial rotor shaft and an inner diameter of the inner coaxial rotor shaft. The inner bearing also requires separate retention with an inner locknut.

Although effective, such an inner locknut and outer locknut arrangement may require a relatively thick shaft wall to support both external and internal threads for each locknut. This may form the potential for a multiple of stress risers.

SUMMARY OF THE INVENTION

A locknut assembly according to an exemplary aspect of the present invention includes a locknut defined about an axis, the locknut defines a multiple of inner apertures about an inner diameter and a multiple of outer apertures about an outer diameter.

A coaxial shaft system according to an exemplary aspect of the present invention includes an outer rotor shaft which rotates about an axis of rotation; an inner rotor shaft mounted through the outer rotor shaft; an outer bearing mounted about an outer diameter of the outer rotor shaft; an inner bearing mounted between the outer rotor shaft and the inner rotor shaft; an outer sleeve mounted about the outer rotor shaft to axially abut the outer bearing; an inner sleeve mounted within the outer rotor shaft to axially abut the inner bearing; and a locknut threaded to the outer rotor shaft about the axis of rotation, the locknut defines a multiple of inner apertures which align with the inner sleeve and a multiple of outer apertures which align with the outer sleeve.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE DISCLOSED EMBODIMENT

Figure 1:
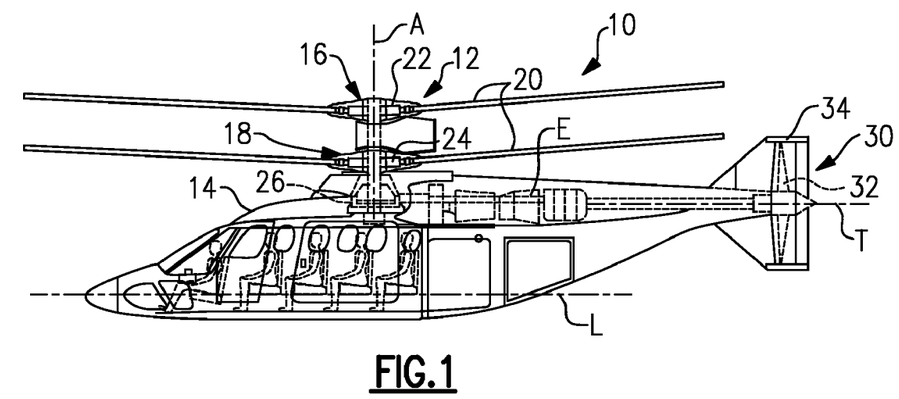
FIG. 1 is a general schematic views of an exemplary rotary wing aircraft embodiment for use with the present invention.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in the disclosed embodiment, other counter-rotating, coaxial rotor systems as well as any coaxial shaft arrangement will also benefit from the present invention.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about a rotor axis of rotation A. A plurality of the main rotor blades 20 project substantially radially outward from the hub assemblies 22, 24. Any number of blades 20 may be used with the rotor system 12.

A main gearbox 26 powered by one or more engines (illustrated schematically at E) drives the rotor system 12. The translational thrust system 30 may also be driven through the main gearbox 26.

The translational thrust system 30 may be mounted to the rear of the airframe 14 with a rotational axis T oriented substantially horizontal and parallel to the aircraft longitudinal axis L to provide thrust for high-speed flight. The translational thrust system 30 includes a pusher propeller 32 mounted within an aerodynamic cowling 34. Although a tail mounted translational thrust system 30 is disclosed in the illustrated non-limiting embodiment, it should be understood that other translational thrust systems including tractor and pod mounted systems may alternatively or additionally be utilized.

Figure 2A:
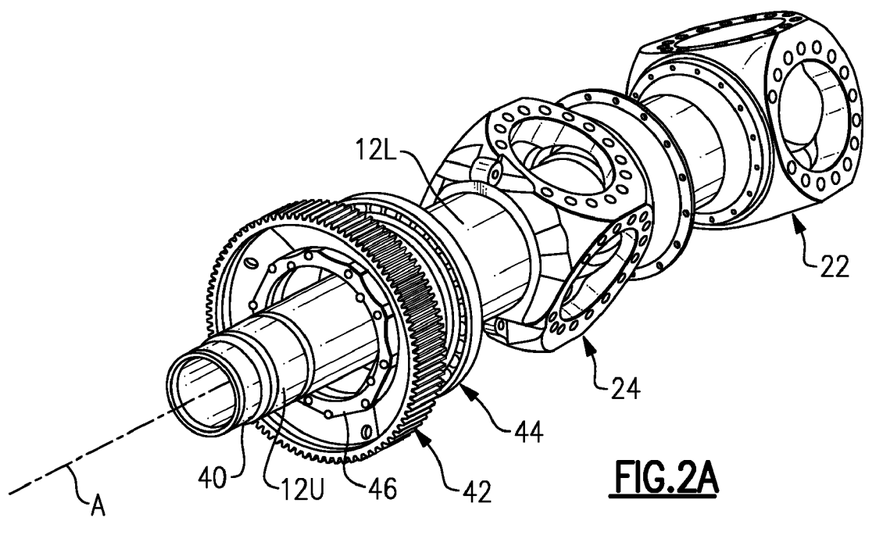
FIG. 2A is an expanded perspective view of a counter-rotating coaxial rotor system.

Referring to FIG. 2A, the dual, counter-rotating, coaxial rotor system 12 includes an inner rotor shaft 12U which mounts the rotor hub 22 and an outer rotor shaft 12L which mounts the rotor hub 24. The inner rotor shaft 12U and the outer rotor shaft 12L are driven in a counter-rotational arrangement by the main gearbox 26 through, in one non-limiting embodiment, a spline arrangement 40 on the inner rotor shaft 12U and a main gear 42 mounted to the outer rotor shaft 12L.

Figure 2B:
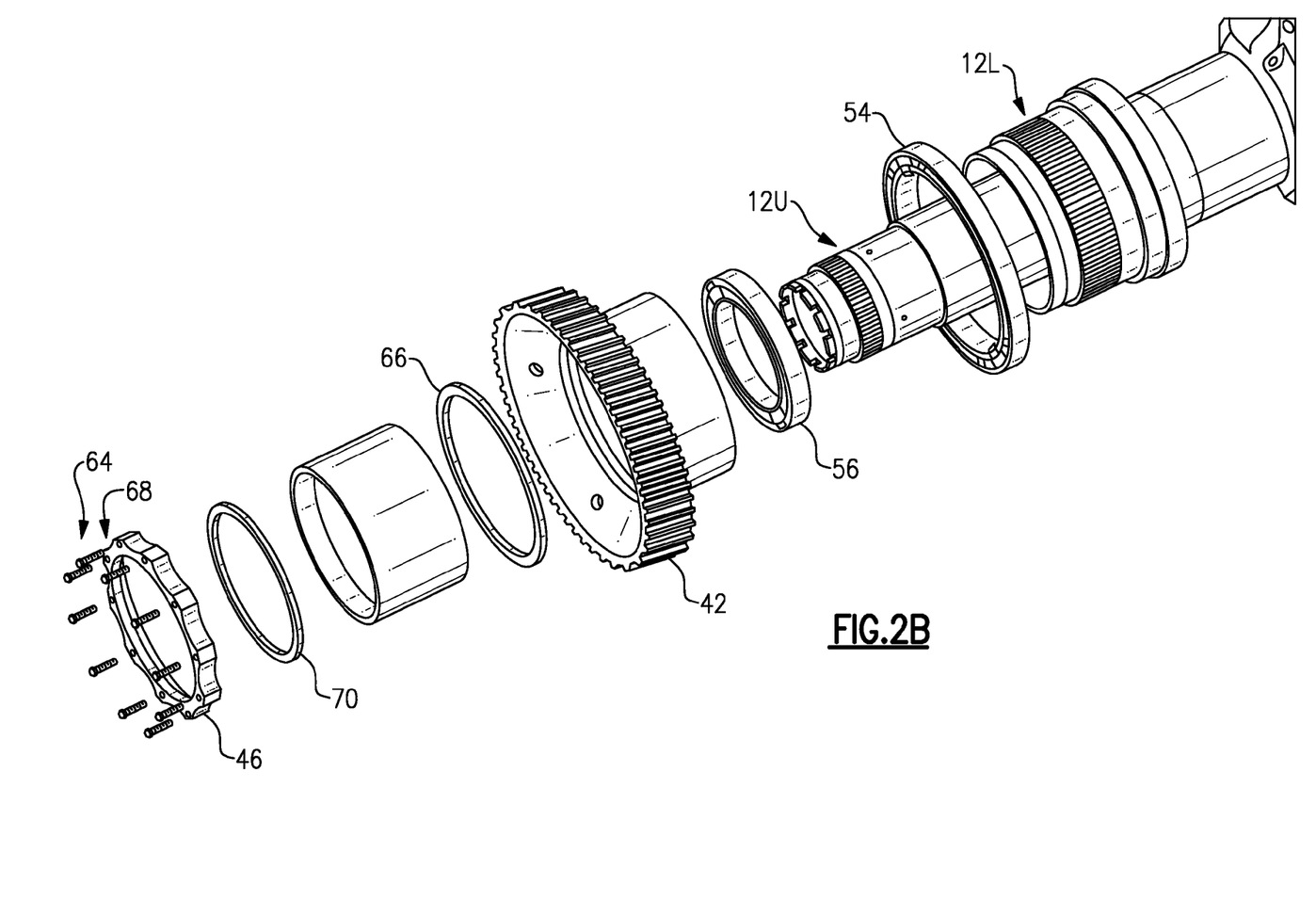
FIG. 2b is an exploded view of the counter-rotating coaxial rotor system of FIG. 2A.

The main gear 42 and a bearing system 44 are retained on the outer rotor shaft 12L through a locknut assembly 46 such that the outer rotor shaft 12L and the main gear 42 mounted thereto may counter-rotate relative the inner rotor shaft 12U upon the bearing system 44 (FIG. 2B). It should be understood that although a main rotor system 12 is illustrated in the non-limiting embodiment, other coaxial shaft systems may also utilize the locknut assembly 46. It should also be understood that although a single bearing system 44 is illustrated in the non-limiting embodiment, any number of bearing systems 44 may be utilized with this or other such coaxial shaft systems.

Figure 3:
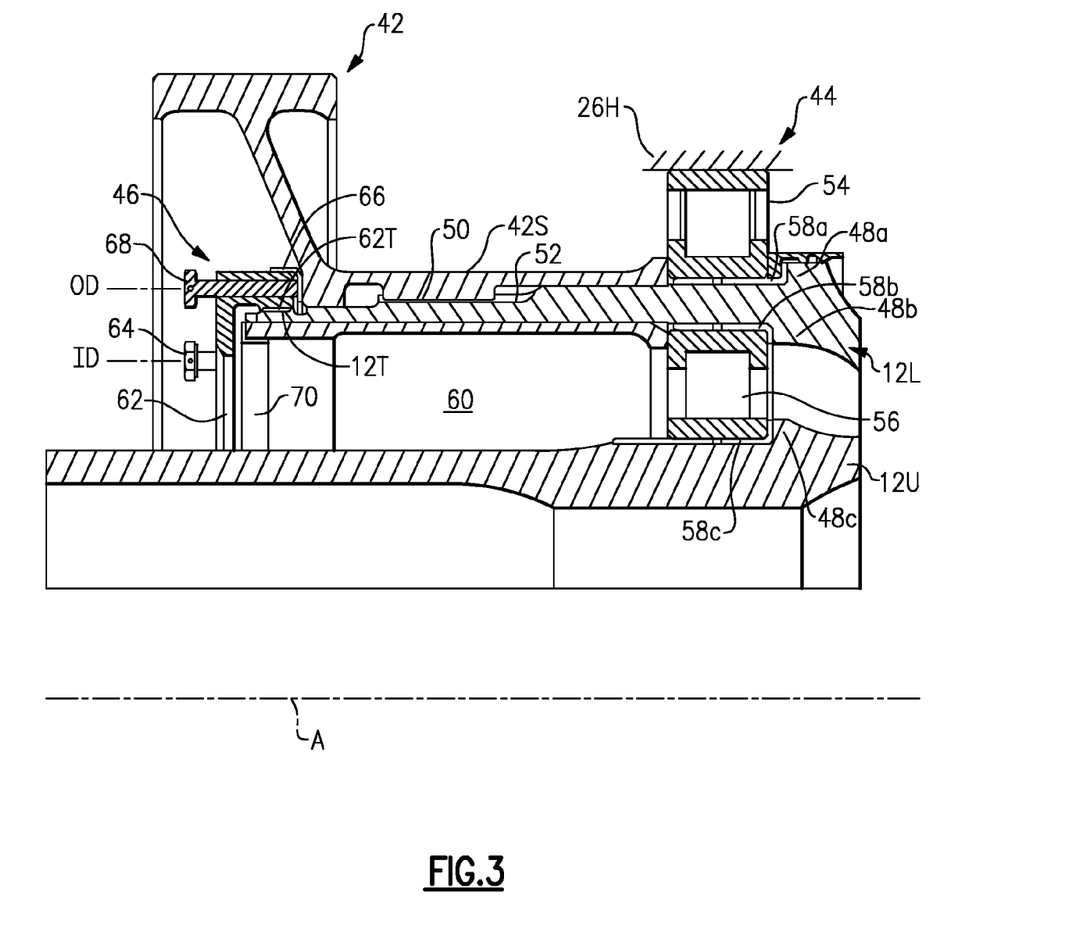
FIG. 3 is a side sectional view of a locknut assembly.

Referring to FIG. 3, the main gear 42 is rotationally locked to the outer rotor shaft 12L through a main gear spline 50 which engages with an outer rotor shaft spline 52. The main gear 42 may include a main gear outer sleeve section 42S which axially abuts the bearing system 44. It should be understood that other constructions including separate sleeves and such like may alternatively or additionally be provided.

Figure 4:
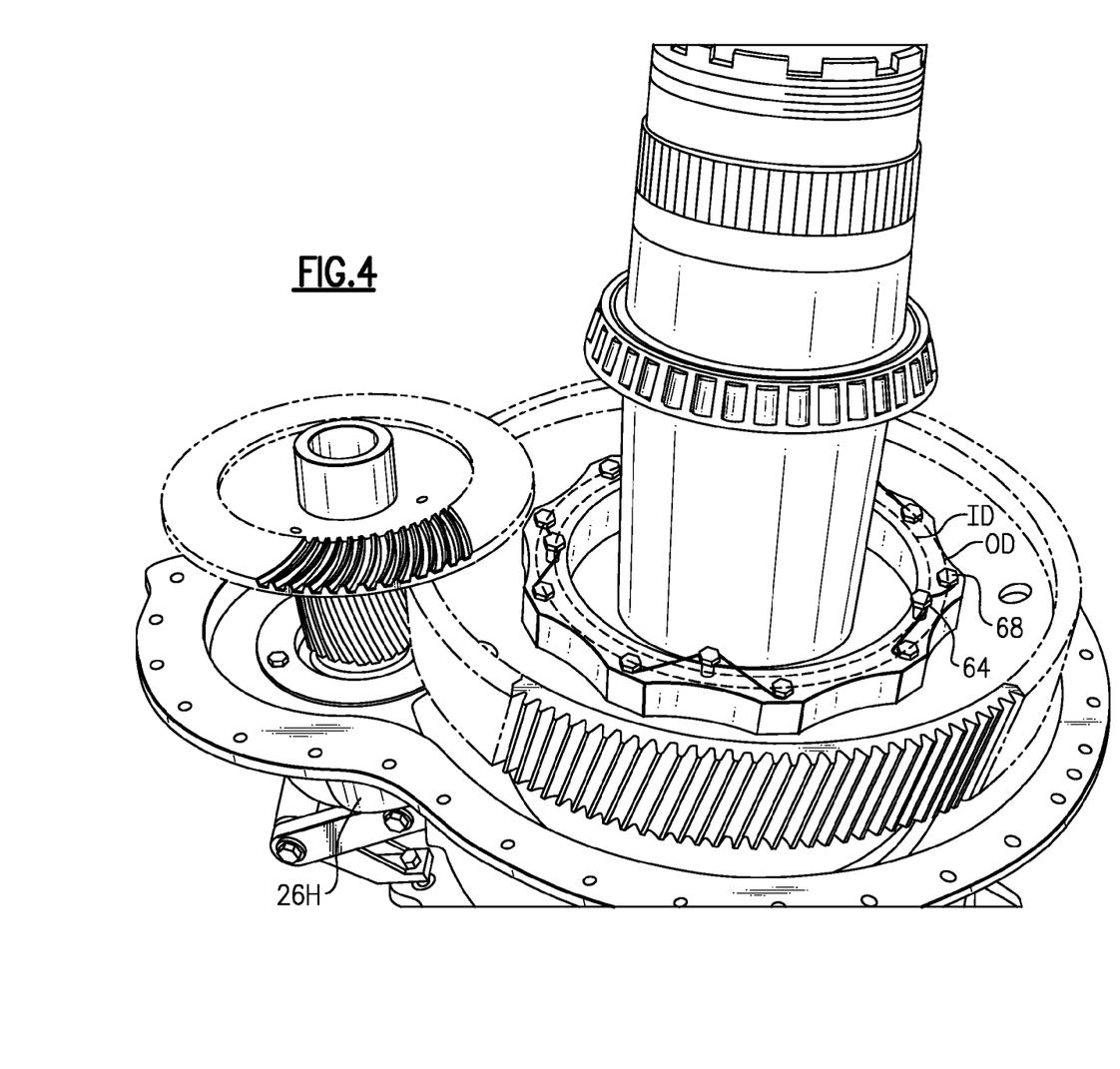
FIG. 4 is a perspective view of the locknut assembly.

The bearing system 44 generally includes an outer bearing 54 and an inner bearing 56. The outer bearing 54 is positioned between the outer rotor shaft 12L and {a?} rotationally fixed component such as a housing 26H of the main gearbox 26 (also illustrated in FIG. 4). The outer bearing 54 abuts an outer outer-shaft step 48a in the outer rotor shaft 12L. An outer sacrificial sleeve 58a may be utilized to mount the outer bearing 54 to outer rotor shaft 12L. The inner bearing 56 is positioned between the outer rotor shaft 12L and the inner rotor shaft 12U to provide relative rotation therebetween. The inner bearing 56 abuts an inner outer-shaft step 48b and an outer inner-shaft step 48c. The inner bearing 56 may be mounted to the outer rotor shaft 12L and the inner rotor shaft 12U through respective sacrificial sleeves 58b, 58c. The sacrificial sleeves 58a, 58b, 58c may be contoured at least partially to the respective steps 48a, 48b, 48c.

The main gear outer sleeve section 42S, defined about an outer diameter of the outer rotor shaft 12L, axially abuts the outer bearing 54 opposite the step 48a. A bearing retention inner sleeve 60 mounted within an inner diameter of the outer rotor shaft 12L axially abuts the inner bearing 56 opposite the steps 48b, 48c. The bearing system 44, the main gear 42 and the bearing retention inner sleeve 60 are axially locked through the locknut assembly 46.

The locknut assembly 46 generally includes a locknut 62, a multiple of inner preload fasteners 64, an outer sacrificial washer 66, a multiple of outer preload fasteners 68 and an inner sacrificial washer 70. The locknut 62 includes a locknut thread 62T which threadably engages a corresponding thread 12T on the outer rotor shaft 12L. That is, the locknut 62 is threaded onto the outer rotor shaft 12L to axially lock the bearing system 44, the main gear 42 and the bearing retention inner sleeve 60 onto the outer rotor shaft 12L. thereto.

Figure 5:
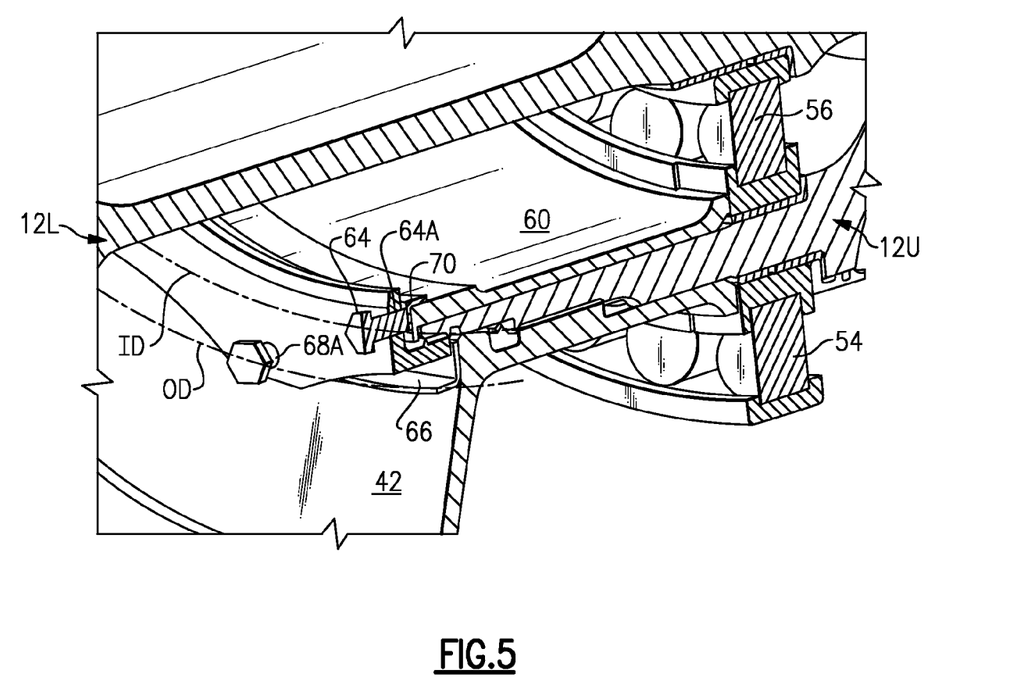
FIG. 5 is an expanded perspective sectional view of the locknut assembly.

The multiple of inner preload fasteners 64 engage a respective multiple of inner apertures 64A defined about an inner diameter ID and the multiple of outer preload fasteners 68 engage a respective multiple of outer apertures 68A defined about an outer diameter OD (also illustrated in FIG. 5). The multiple of outer apertures 68A are circumferentially staggered relative the multiple of respective outer apertures 68A. Circumferentially staggered as defined herein locates each of the multiple of inner apertures 64A on a respective radial line which extends from the axis A such that each of the multiple of the outer apertures 68A are not located upon these radial lines.

Figure 6:
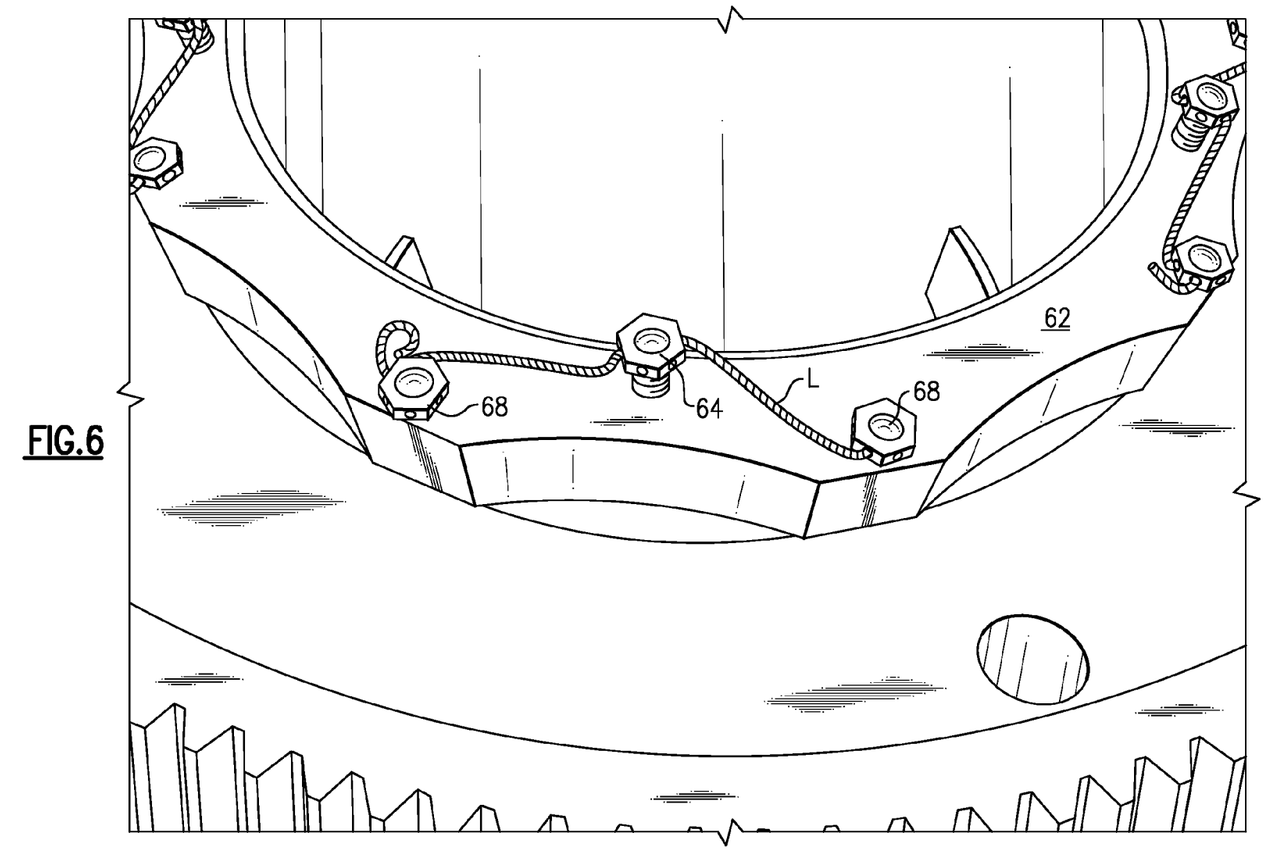
FIG. 6 is an expanded view of a locknut assembly preload fasteners lockwired together.

The multiple of inner preload fasteners 64 are torqued to provide a desired axial preload on the bearing retention inner sleeve 60 and the inner bearing 56. The multiple of outer preload fasteners 68 are torqued to provide a desired axial preload on the main gear 42 and the outer bearing 54. The multiple of inner preload fasteners 64 and the multiple of outer preload fasteners 68 abut the respective outer rotor shaft sacrificial washer 66 and main gear sacrificial washer 70 so as to minimize wear on the primary component. Sets of the multiple of inner preload fasteners 64 and the multiple of outer preload fasteners 68 may include lockwires L to assure retention. (FIG. 6).

The locknut assembly 46 provides a light weight design, which facilitates manufacture of increased strength coaxial shaft arrangements through minimization or elimination of many screw thread radii and associated thread relief.

It should be understood that relative positional terms such as "forward," "aft," "upper," "lower," "above," "below," and the like are with reference to an illustrated attitude of the structure and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A locknut assembly comprising:
   a locknut defined about an axis, said locknut defines a multiple of inner apertures along an inner diameter and a multiple of outer apertures along an outer diameter, said multiple of inner apertures at least partially threaded and said multiple of outer apertures at least partially threaded, wherein said locknut defines a locknut thread about said axis, said locknut thread defines a lockout thread diameter intermediate said inner diameter and said outer diameter.

2. The assembly as recited in claim 1, wherein no portion of said multiple of inner apertures radially overlaps a portion of said multiple of outer apertures.

3. A lock nut assembly comprising:
   a locknut defined about an axis, said locknut defines a multiple of inner apertures along an inner diameter and a multiple of outer apertures along an outer diameter, said multiple of inner apertures at least partially threaded and said multiple of outer apertures at least partially threaded, said multiple of inner apertures and said multiple of outer apertures are defined through a common plane and generally parallel to said axis; and
   wherein said locknut defines a locknut thread about said axis, said locknut thread defines a locknut thread diameter intermediate said inner diameter and said outer diameter.

4. The assembly as recited in claim 3, wherein said multiple of inner apertures are circumferentially staggered relative to said multiple of outer apertures through a generally planar surface.

5. The assembly as recited in claim 3, further comprising:
   a multiple of inner preload fasteners threadably engageable with said multiple of inner apertures; and
   a multiple of outer preload fasteners threadably engageable with said multiple of outer apertures.

6. A coaxial shaft system comprising:
   an outer rotor shaft which rotates about an axis of rotation;
   an inner rotor shaft which rotates about said axis of rotation, said inner rotor shaft mounted through said outer rotor shaft;
   an outer bearing mounted about an outer diameter of said outer rotor shaft to at least partially support said outer rotor shaft;
   an inner bearing mounted between said outer rotor shaft and said inner rotor shaft to at least partially support said inner rotor shaft;
   an outer sleeve mounted about said outer rotor shaft to axially abut and at least partially hold said outer bearing;
   an inner sleeve mounted within said outer rotor shaft to axially abut and at least partially hold said inner bearing; and
   a locknut threaded to said outer rotor shaft about said axis of rotation, said locknut defines a multiple of inner apertures in axial alignment with a portion of said inner sleeve and a multiple of outer apertures in axial alignment with a portion of said outer sleeve, said multiple of inner apertures at least partially threaded and said multiple of outer apertures at least partially threaded.

7. The system as recited in claim 6, wherein said multiple of inner apertures are defined about an inner diameter and said multiple of outer apertures are defined about an outer diameter defined through a common plane and generally parallel to said axis of rotation, said locknut thread intermediate said inner diameter and said outer diameter.

8. The system as recited in claim 6, wherein said outer sleeve is defined by a gear.

9. The system as recited in claim 6, wherein said outer bearing axially abuts a step defined in said outer diameter of said outer rotor shaft, said inner bearing axially abuts a step defined in an inner diameter of said outer rotor shaft and a step defined in an outer diameter of said inner rotor shaft.

10. The system as recited in claim 6, further comprising a lower rotor hub mounted to said outer rotor shaft and an upper rotor hub mounted to said inner rotor shaft.

11. The system as recited in claim 6, wherein said outer sleeve is mounted to said outer rotor shaft though a spline.

12. The system as recited in claim 11, further comprising:
a multiple of inner preload fasteners threadably engageable with said multiple of inner apertures to generate an axial preload to said inner sleeve; and
a multiple of outer preload fasteners threadably engageable with said multiple of outer apertures to generate an axial preload to said outer sleeve.

13. The system as recited in claim 12, further comprising a first sacrificial washer mounted to said inner sleeve to receive said multiple of inner preload fasteners, and a second sacrificial washer mounted to said outer sleeve to receive said multiple of outer preload fasteners.

14. A method of generating an axial preload upon a coaxial shaft system comprising:
threading a locknut to an outer rotor shaft, the outer rotor shaft mounted about an inner rotor shaft which rotates about an axis of rotation;
threading an inner multiple of preload fasteners through said locknut to generate an axial preload upon an inner sleeve mounted within said outer rotor shaft and providing some support to said outer rotor shaft; and
threading an outer multiple of preload fasteners through said locknut to generate an axial preload upon an outer sleeve mounted about said outer rotor shaft and providing some support to said outer rotor shaft.

15. A method as recited in claim 14, further comprising:
abutting said inner sleeve with an inner bearing between the inner rotor shaft and the outer rotor shaft; and
abutting said outer sleeve with an outer bearing, the outer bearing operable to support the outer rotor shaft.

16. An apparatus comprising:
an outer rotor shaft which rotates about an axis of rotation;
an inner rotor shaft which rotates about said axis of rotation, said inner rotor shaft mounted through said outer rotor shaft and providing some support to said outer rotor shaft;
an outer bearing mounted about an outer diameter of said outer rotor shaft;
an inner bearing mounted between said outer rotor shaft and said inner rotor shaft and providing some support to said outer rotor shaft and said inner rotor shaft;
an outer sleeve mounted about said outer rotor shaft to axially abut and at least partially hold said outer bearing;
an inner sleeve mounted within said outer rotor shaft to axially abut and at least partially hold said inner bearing; and
a locknut threaded to said outer rotor shaft about said axis of rotation, said locknut defines a multiple of inner apertures in axial alignment with a portion of said inner sleeve and a multiple of outer apertures in axial alignment with a portion of said outer sleeve, said multiple of inner apertures at least partially threaded and said multiple of outer apertures at least partially threaded.

17. The system as recited in claim 16, wherein said apparatus comprises an aircraft.

18. The system as recited in claim 16, wherein said apparatus comprises a rotary-wing aircraft.

19. The system as recited in claim 16, wherein said apparatus comprises a helicopter.

* * * * *